United States Patent [19]

Takahashi et al.

[11] Patent Number: 4,923,246
[45] Date of Patent: May 8, 1990

[54] LID REGULATING DEVICE OF SUN ROOF STRUCTURE

[75] Inventors: Jun Takahashi; Ryoji Shimura, both of Yokohama, Japan

[73] Assignee: Ohi Seisakusho Co., Ltd., Yokohama, Japan

[21] Appl. No.: 216,650

[22] Filed: Jul. 8, 1988

[30] Foreign Application Priority Data

| Jul. 13, 1987 | [JP] | Japan | 62-172827 |
| Jul. 13, 1987 | [JP] | Japan | 62-172826 |
| Jul. 31, 1987 | [JP] | Japan | 62-190470 |
| Feb. 2, 1988  | [JP] | Japan | 63-21264  |

[51] Int. Cl.$^5$ .................................................. B60J 7/05
[52] U.S. Cl. ................................ 296/221; 296/223; 296/224
[58] Field of Search ................................ 296/221-224

[56] References Cited

U.S. PATENT DOCUMENTS

| 4,632,449 | 12/1986 | Masuda  | 296/222 |
| 4,647,105 | 3/1987  | Pollard | 296/221 |

FOREIGN PATENT DOCUMENTS

| 143589     | 6/1985  | European Pat. Off.        |         |
| 0182431    | 5/1986  | European Pat. Off.        | 296/222 |
| 2543774    | 4/1977  | Fed. Rep. of Germany      | 296/222 |
| 2800909    | 11/1978 | Fed. Rep. of Germany      | 296/222 |
| 3520563    | 12/1986 | Fed. Rep. of Germany      | 296/221 |
| 59-202934  | 11/1984 | Japan .                   |         |
| 61-92921   | 5/1986  | Japan .                   |         |
| 0071723    | 4/1987  | Japan                     | 296/220 |
| 0154426    | 6/1988  | Japan                     | 296/221 |
| 2147943    | 5/1985  | United Kingdom .          |         |
| 2193996    | 2/1988  | United Kingdom .          |         |

Primary Examiner—Dennis H. Pedder
Attorney, Agent, or Firm—Foley & Lardner, Schwartz, Jeffery, Schwaab, Mack, Blumenthal & Evans

[57] ABSTRACT

There is disclosed a lid regulating device for use in a sun roof structure of a motor vehicle or the like. The lid regulating device comprises a guide rail extending along each side of the sun roof opening and secured to the roof; a first sliding shoe slidably engaged with the guide rail, the first sliding shoe having an extension which is pivotally connected to a front portion of the lid; a second sliding shoe slidably engaged with the guide rail and supporting a rear portion of the lid; and a lid lifting mechanism mounted on the second sliding shoe to tilt the lid upward and downward about the front portion of the lid. The lid lifting mechanism includes mutually spaced first and second walls formed on the second sliding shoe, the first and second walls being respectively formed with first and second asymmetrically positioned guide slots each extending along the corresponding wall; and a lift arm having one end pivotally connected to a rear portion of the lid, the lift arm having at its opposed side surfaces first and second pins which are respectively and slidably engaged with the first and second guide slots.

21 Claims, 9 Drawing Sheets

LID REGULATING DEVICE OF SUN ROOF STRUCTURE

BACKGROUND OF THE INVENTION

1. Field of the Invention

The present invention relates in general to a sun roof structure of a motor vehicle, and more particularly to a lid regulating device of the sun roof structure, which regulates the movement of the sun roof lid. More specifically, the present invention is concerned with the lid regulating devices of a type having a lid lifting mechanism by which the lid in its fully closed position can be tilted up and down.

2. Description of the Prior Art

Hitherto, various kinds of lid regulating devices have been proposed and put into practical use in the field of the sun roof structures of a motor vehicle. One of them is disclosed in Japanese Patent First Provisional Publication No. 61-92921, which has a lid lifting mechanism by which the sun roof lid in its fully closed position can be tilted up having its rear end positioned above the vehicle roof and down having the rear end positioned below the roof.

In order to clarify the task of the present invention, the lid lifting mechanism disclosed by the publication will be outlined with reference to FIGS. 17, 18, 19 and 20.

Figure 17:
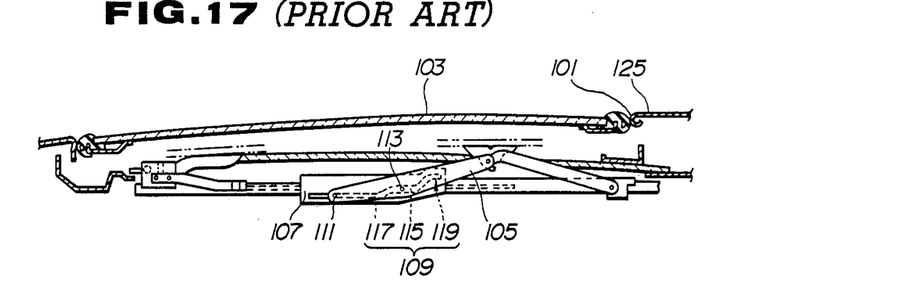
FIGS. 17, 18 and 19 are schematical sectional views of a conventional lid regulating device, showing various conditions of the same respectively.
Figure 18:
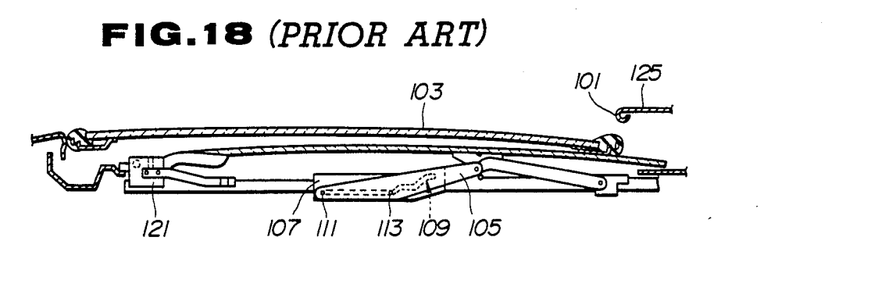
Figure 19:
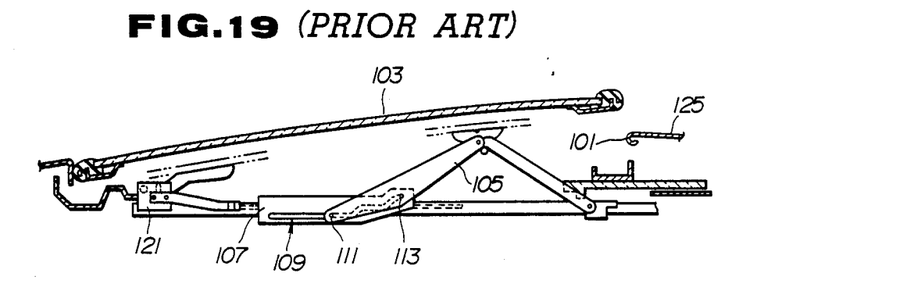
Figure 20:
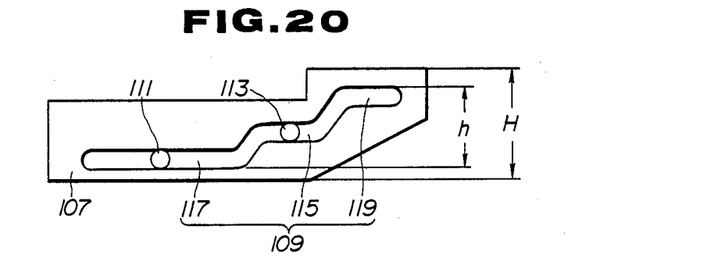
FIG. 20 is an enlarged side view of a sliding shoe employed in the conventional lid regulating device.

Designated by numeral 101 is a sun roof opening which is defined by a vehicle roof 125, with which opening a sun roof lid 103 is incorporated to close and open the same. The lid 103 has a rear end portion pivotally connected with a lift arm 105. The lift arm 105 has at its lower portion first and second pins 111 and 113 which are slidably engaged with a guide groove 109 formed in a sliding shoe 107 which is slidable forward and rearward. As is well shown in FIG. 20, the guide groove 109 comprises a lid fully closing guide part 115, a lid tilting down guide part 117 and a lid tilting up guide part 119. When the second pin 113 is placed at the parts 115, 117 and 119, the lid 103 assumes respectively a fully closed condition wherein, as shown in FIG. 17, the lid 103 fully closes the sun roof opening 101, a tilt-down condition wherein, as shown in FIG. 18, the lid 103 is tilted down having the rear end thereof positioned below the vehicle roof 125 or a tilt up condition wherein, as shown in FIG. 19, the lid 103 is tilted up having the rear end thereof positioned above the roof 125.

However, due to its inherency in construction, the above-mentioned conventional lid lifting mechanism has the following drawbacks.

First, the sliding shoe 107 is compelled to have a considerable height due to the arrangement of the sections 115, 117 and 119 of the guide groove 109. That is, as is seen from the drawings, the two sections 117 and 119 of the guide groove 109 extend in vertically opposite directions (viz., downward and upward) from the middle section 115 of the same. This means that, as is seen from FIG. 20, the guide groove 109 has a height of "h" and thus the sliding shoe 107 has a correspondingly increased height "H". However, the increase in height of the sliding shoe 107 induces a need for enlarging of a space in which the lifting mechanism is installed, and thus the upper space of the passenger room is narrowed.

Second, because the lid lifting device has no means by which the lift arm 105 is tightly restrained by the sliding shoe 107, the lid 103 suffers noisy vibration during running of the vehicle even when assuming the fully closed position.

SUMMARY OF THE INVENTION

It is therefore an object of the present invention to provide a lid regulating device, which is free of the above-mentioned drawbacks.

According to the present invention, there is provided a lid regulating device for use in a sun roof structure which includes a lid and a sun roof opening defined by a roof. The lid regulating device comprises a guide rail extending along each side of the sun roof opening and secured to the roof; a first sliding shoe slidably engaged with the guide rail, the first sliding shoe having an extension which is pivotally connected to a front portion of the lid; a second sliding shoe slidably engaged with the guide rail and supporting a rear portion of the lid; and a lid lifting mechanism mounted on the second sliding shoe to tilt the lid upward and downward about the front portion of the lid, the lid lifting mechanism including mutually spaced first and second walls formed on the second sliding shoe, the first and second walls being respectively formed with asymmetric first and second guide slots each extending along the corresponding wall; and a lift arm having one end pivotally connected to a rear portion of the lid, the lift arm having at its opposed side surfaces asymmetrically positioned first and second pins which are respectively and slidably engaged with the first and second guide slots.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

Figure 4A:
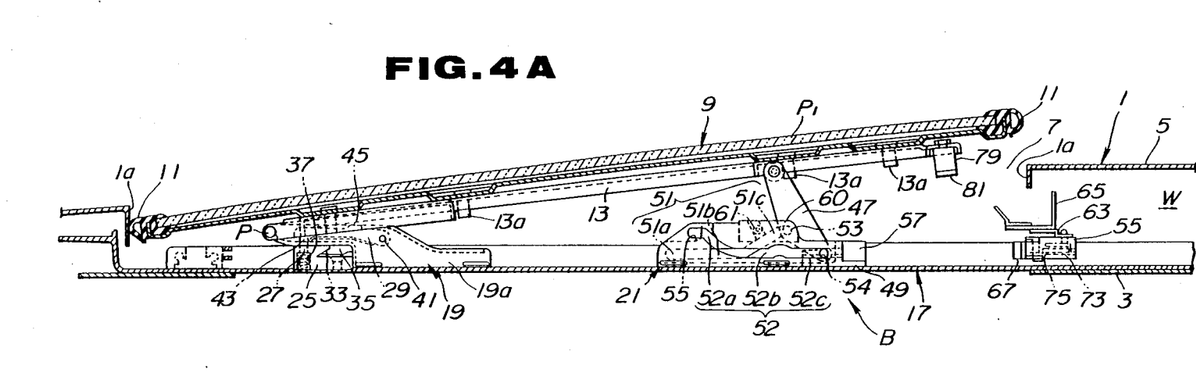
FIG. 4A is a sectional view of a sun roof structure to which a lid regulating device of the present invention is practically applied, showing a condition wherein the lid assumes a tilt up position.

Referring to the accompanying drawings, particularly FIG. 4A, there is shown a sun roof structure to which the lid regulating device of the present invention is practically applied.

As is seen from FIG. 4A, the sun roof structure comprises a sun roof opening 7 formed in a roof panel 1 of a motor vehicle. The roof panel shown in the drawing includes an inner panel 3 and an outer panel 5 which are combined in a known manner. The outer panel 5 has a normally bent edge 1a by which the sun roof opening 7 is bounded. A sun roof lid 9 of transparent material is incorporated with the opening 7 in a manner to open and close the same, as will be described in detail hereinafter.

Figure 5A:
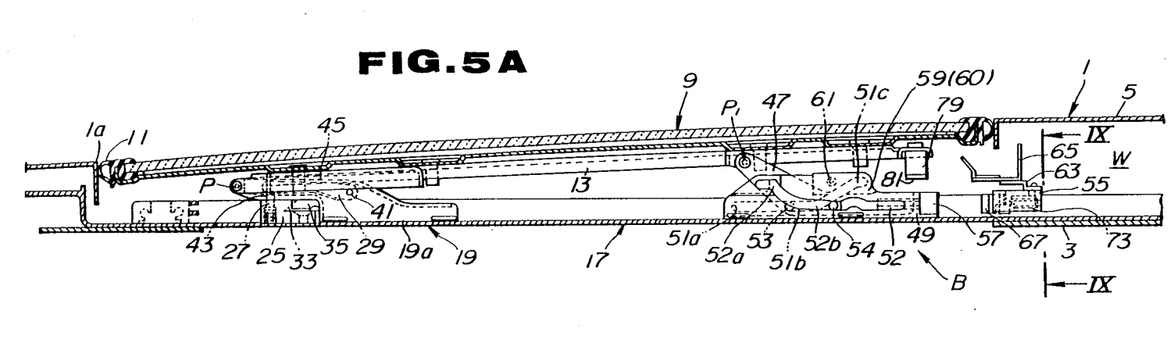
FIG. 5A is a view similar to FIG. 4A, but showing a condition wherein the lid assumes its full-closed position.

The lid 9 is equipped about its peripheral edge with a weather strip 11. Upon full closing of the lid 9 as shown in FIG. 5A, the weather strip 11 is brought into a resilient contact with the bent edge 1a of the sun roof opening 7 thereby achieving a watertight seal therebetween.

A pair of (viz., right and left) lid control units are incorporated with the lid 9 for controlling movement of the lid 9 relative to the sun roof opening 7. These units are arranged at lateral sides of the sun roof opening 7, respectively. The two units are substantially the same in construction. That is, the parts of the two units are arranged substantially symmetrically with respect to an axis of the sun roof opening 7.

Thus, the following description will be directed to only one of them, that is, to the left unit which is arranged at the left side of the sun roof opening 7. (The terms "right" and "left" are to be understood with respect to a person who sits with his or her breast directed forward).

Figure 8:
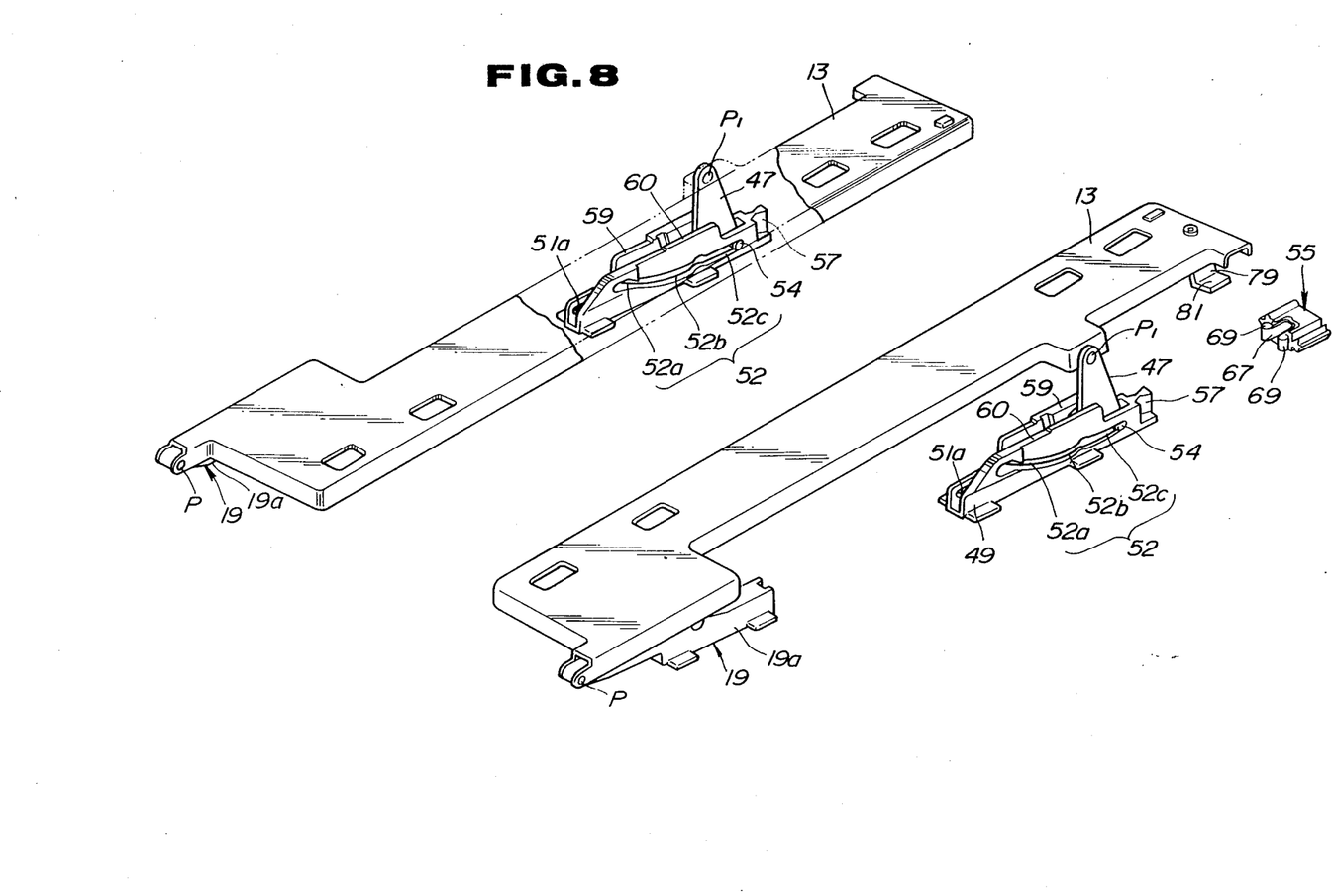
FIG. 8 is a perspective view of a lid mounting bracket.

The left unit comprises an elongate mounting bracket 13 (viz., the bracket 13 illustrated in the right side of FIG. 8) which is secured through connecting bolts 13a (see FIG. 4A) to a left side of the lower surface of the lid 9 to extend along the same, as is seen from FIG. 4A.

Figure 9:
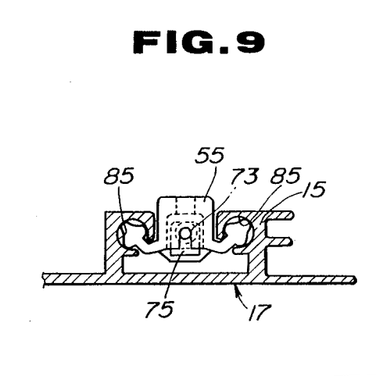
FIG. 9 is an enlarged sectional view taken along the line IX—IX of FIG. 5A.

Below the mounting bracket 13, there is arranged a left guide rail 17 which extends along the left side of the sun roof opening 7. As is seen from FIG. 4A, the guide rail 17 is securely mounted on the inner panel 3 of the roof panel 1. As is seen from FIG. 9, the guide rail 17 is formed with a channel structure 15 which extends therealong with its open side directed upward, that is, toward left mounting bracket 13.

Within the channel structure 15 of the guide rail 17, there is disposed a major portion of a first sliding shoe 19a which is slidable therealong in a fore-and-aft direction. The first sliding shoe 19a is a part of a supporting mechanism 19 by which a front left portion of the lid 9 is supported. As is seen from FIG. 1, the first sliding shoe 19a comprises a base portion slidably received in the channel structure 15 of the guide rail 17 and an extension portion exposed to the outside of the channel structure 15. As is seen from FIG. 8, a leading end of the extension portion is pivotally connected to a front end of the mounting bracket 13 through a pivot pin P. For this pivotal connection, the front end of the mounting bracket 13 is formed at its outboard side with forwardly projected spaced walls (no numerals) between which the leading end of the extension portion is put with the pivot pin P horizontally extending therebetween.

A rear portion of the mounting bracket 13 is supported by an after-described lifting mechanism 21, so that the rear portion is lifted from the guide rail 17 under a given condition.

Figure 1:
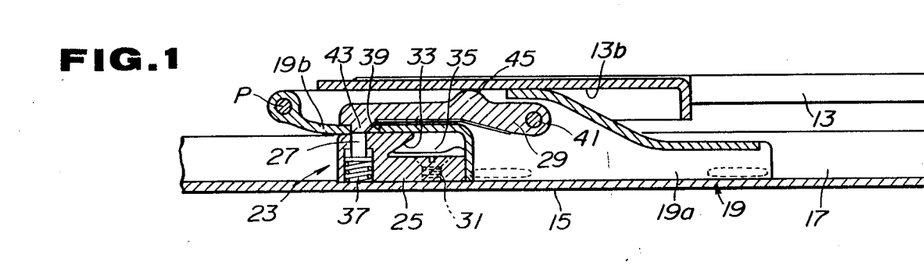
FIG. 1 is a sectional view of a first sliding shoe employed in a lid regulating device according to the present invention.
Figure 2:
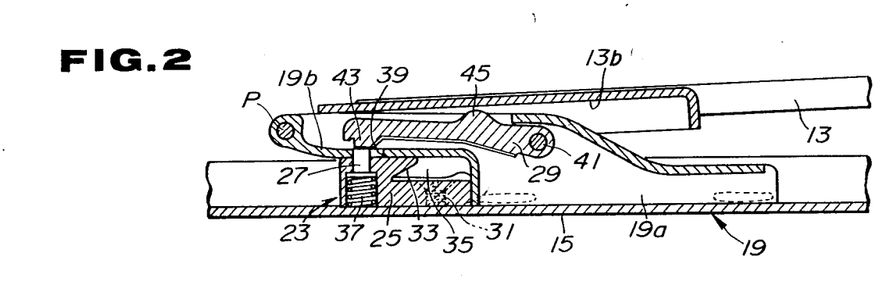
FIGS. 2 and 3 are views similar to FIG. 1, but showing different conditions of the first sliding shoe respectively.
Figure 3:
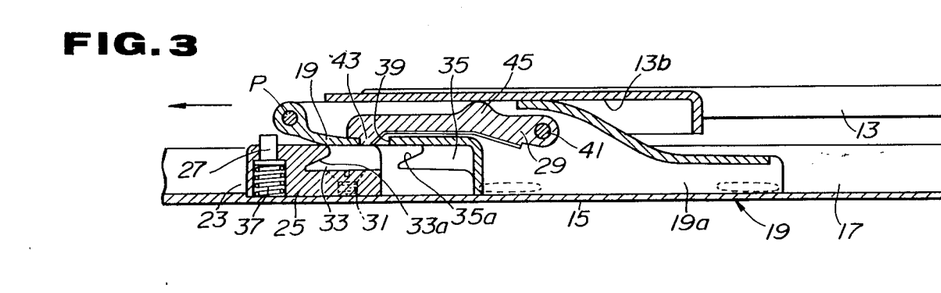

As is shown in FIG. 1, a lock mechanism 23 is mounted on a front part of the guide rail 17 to latch or stop the first sliding shoe 19a. The lock mechanism 23 comprises a holder 25 secured through a bolt 31 to a bottom of the channel structure 15. The holder 25 is formed with a vertically extending bore (no numeral) in which a stopper pin 27 is slidably received. A coiled spring 37 is put in a bottom of the bore to bias the stopper pin 27 upward causing an upper end of the pin 27 to project from the bore. As will become apparent as the description proceeds, under a given condition, the projected upper end of the stopper pin 27 is pressed downward by an operation lever 29 which is pivotally carried by the first sliding shoe 19a. The holder 25 is formed at its rear portion with a wedge shaped recess 33 which faces rearward as shown. The recess 33 is bounded at its upper portion by a tapered wall 33a. That is, the tapered wall 33a slopes down toward the depth of the recess 33.

A boss 35 is integrally formed on a lower surface 19b of the extension portion of the first sliding shoe 19a, which is thrusted into the recess 33 of the holder 25 when the first sliding shoe 19a comes to its foremost position as shown in FIG. 1. The boss 35 is formed with a wedge-shaped front portion which is matched with the wedge-shaped recess 33 of the holder 25. Thus, once the wedge-shaped boss 35 is neatly mated with the wedge-shaped recess 33, the undesired upward and downward play of the front portion of the lid 9 is suppressed.

The extension portion of the first sliding shoe 19a is formed at its lower wall 19b with a stopper opening 39 which is sized to receive therein the upper end of the stopper pin 27. That is, when the first sliding shoe 19a slides to its foremost position wherein the stopper opening 39 is coincident with the stopper pin 27, the latter is thrusted into the stopper opening 39 due to the force of the spring 37. Thus, thereafter, the forward and rearward movement of the first sliding shoe 19a is suppressed.

The operation lever 29 is almost received in a recess formed in the extension portion of the first sliding shoe 19a and pivotally supported at its rear end to a middle portion of the first sliding shoe 19a through a pivot pin 41. A free end of the operation lever 29 is formed with a downward projection 43 which can fall into the stopper opening 39. The downward projection 43 is so sized and constructed that when the operation lever 29 assumes its lowermost position as shown in FIG. 1, the downward projection 43 fills up the stopper opening 39. The operation lever 29 is formed near the pivoted rear end thereof with an upward projection 45. As will be described hereinafter, while the lid 9 is being tilted down, the upward projection 45 is kept pressed downward by a lower surface 13a of the mounting bracket 13.

The lifting mechanism 21 is pivotally arranged on a second sliding shoe 49 which is also slidably engaged with the channel structure 15 of the guide rail 17. As is best seen from FIG. 7, the lifting mechanism 21 comprises a lift arm 47 which has a leading end pivotally connected to the mounting bracket 13 through a pivot pin $P_1$ (see FIG. 8). A base portion of the lift arm 47 has on opposed side surfaces thereof first and second pins 53 and 54 slidably received in first and second guide slots 51 and 52 which are possessed by the second sliding shoe 49, as will be described in the following. The first pin 53 is located at a generally middle portion of the lift arm 47, while, the second pin 54 is located at the other end of the lift arm 47, as shown. Thus, the first pin 53 and the second pin 54 are asymmetrically arranged with respect to the opposite sides of the lift arm 47. (See FIGS. 4B and 7).

Figure 6A:
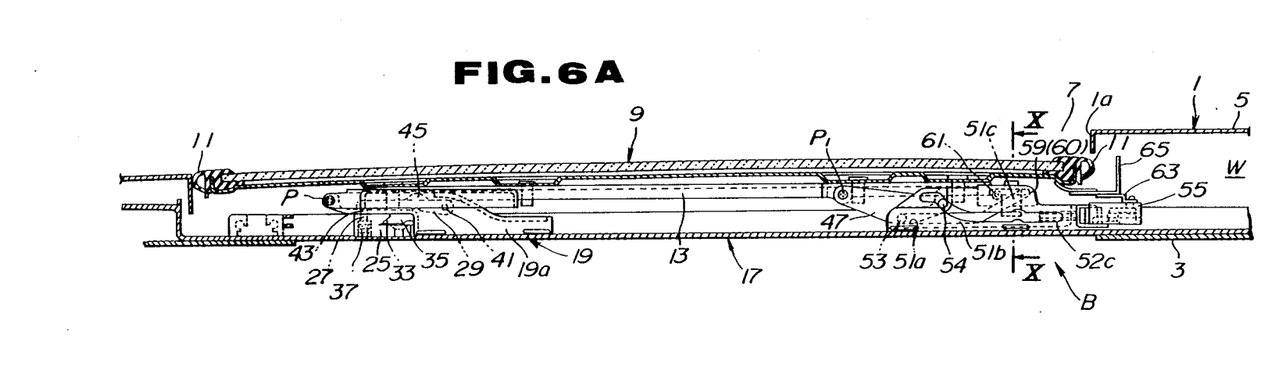
FIG. 6A is a view also similar to FIG. 4A, but showing a condition wherein the lid assumes a tilt-down position.
Figure 6B:
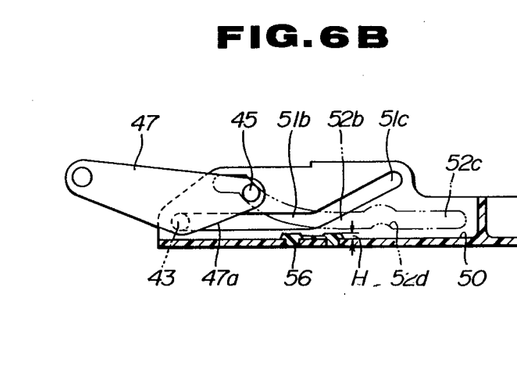
FIG. 6B is a view similar to FIG. 4B, but showing a condition assumed when the lid is in the tilt-down position.
Figure 7:
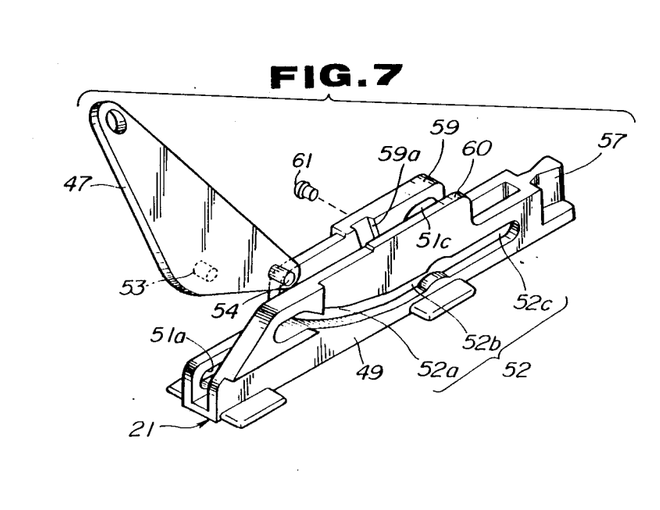
FIG. 7 is a perspective view of the lid lifting mechanism which is incorporated with a second sliding shoe employed in the present invention.

The second sliding shoe 49 is located behind the afore-mentioned first sliding shoe 19a (see FIG. 4A) and axially slidably guided by the channel structure 15 of the guide rail 17. The second sliding shoe 49 is formed at its rear end with an engaging portion 57 to which an after-mentioned third sliding shoe 55 is detachably connected. As is shown in FIG. 7, the engaging portion 57 comprises a thinner base part and a thicker head part which are integrally connected to constitute a dove-tail structure. The second sliding shoe 49 is formed with spaced first and second walls 59 and 60 which extend in parallel and are respectively formed with the above-mentioned first and second guide slots 51 and 52. The distance between the first and second walls 59 and 60 is somewhat greater than the thickness of the lift arm 47. As shown, the first wall 59 has a front end portion cut. The second guide slot 52 of the second wall 60 has an enlarged front end which is exposed to the cut front portion of the first wall 59, so that, as will be understood from FIG. 7, during assembling process, the second pin 54 of the lift arm 47 can be easily brought into engagement with the second guide slot 52 from the outside. The first wall 59 is formed at its inboard surface with a pin leading groove 59a which extends from an upper end of the wall 59 to a given portion of the first guide slot 51. Thus, the first pin 53 of the lift arm 47 can be easily brought into engagement with the first guide slot 51 by sliding through the pin leading groove 59a from the outside. The guide groove 59a is formed with a bolt opening to which a bolt 61 (see FIG. 6A) is to be fixed for closing the guide groove 59a. That is, after the lift arm 47 is properly fitted to the second sliding shoe 49, the bolt 61 is fixed to the guide groove 59a to close the same.

Figure 4B:
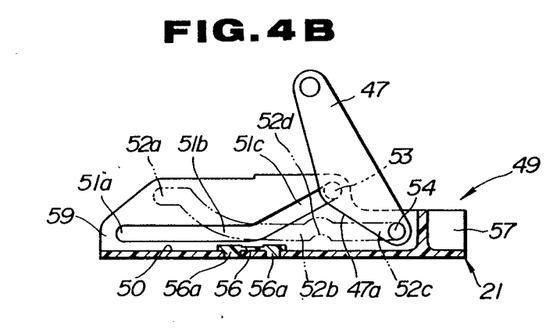
FIG. 4B is an enlarged view of the part indicated by the arrow B in FIG. 4A, which is a lid lifting mechanism.

As is best seen from FIG. 4B, the first guide slot 51 formed in the first wall 59 comprises a first horizontal part 51a located at a front portion of the slot 51, a second horizontal part 51b located at a middle portion of the slot 51 and a third inclined part 51c located at a rear part of the same. As will be described hereinafter, when the first pin 53 slides forward within the first horizontal part 51a, the lid 9 is tilted down having the rear end thereof lowered below the outer panel 5 of the vehicle roof, and when the first pin 53 is placed within the second horizontal part 51b, the lid 9 assumes its fully closed position, and when the first pin 53 slides rearward within the third inclined part 51c, the lid 9 is tilted up having the rear end located above the outer panel 5.

As is seen from FIG. 7, the second guide slot 52 formed in the second wall 60 comprises a first inclined part 52a placed at a front portion of the slot 52, a second generally horizontal part 52b placed at a middle portion of the slot 52 and a third horizontal part 52c placed at a rear part of the same. That is, when the second pin 54 slides forward within the first inclined part 52a, the lid 9 is tilted down, and when the second pin 54 is placed within the second part 52b, the lid 9 assumes the fully closed position, and when the second pin 54 slides rearward within the third horizontal part 52c, the lid 9 is tilted up. For the purpose which will be clarified hereinafter, the second guide slot 52 is formed with a rounded projection 52d (see FIG. 4B) within the zone of the second part 52b. It is to be noted that, as is seen from FIG. 7, the second parts 51b and 52b of the first and second guide slots 51 and 52 are placed at the same level, and the first part 51a of the first guide slot 51 is positioned below the first part 52a of the second guide slot 52, and the third part 51c of the first guide slot 51 is placed above the third part 52c of the second guide slot 52. Thus, the guide paths defined by the guide slots 51 and 52 are asymmetric with respect to a centrally extending longitudinal cross-sectional plane between the first wall 59 and the second wall 60. (See FIGS. 4B and 7).

Figure 5B:
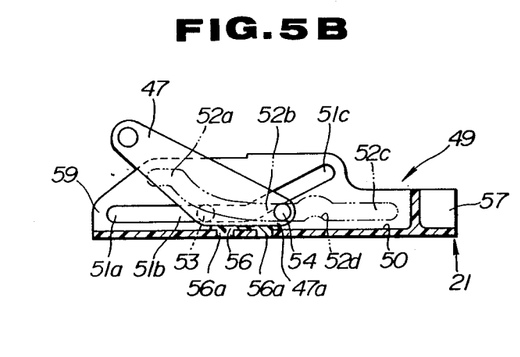
FIG. 5B is a view similar to FIG. 4B, but showing a condition assumed when the lid is in the full-closed position.

The lid lifting mechanism is further provided with a lift arm biasing means which functions to stably hold the lift arm 47 when the lid 9 is in the fully closed position. As is best seen from FIG. 4B, the second sliding shoe 49 is provided at its bottom portion 50 with a resiliently deformable member 56, such as rubber, plastic or the like. The member 56 has two leg portions 56a tightly mated with respective openings (no numerals) formed in the bottom portion 50 of the shoe 49. As is seen from FIG. 5B, the resiliently deformable member 56 is so sized and constructed that when the lift arm 47 assumes the neutral position as shown in the drawing, a lower side 47a of the lift arm 47 is pressed against the member 56. Thus, the lift arm 47 under such condition is suppressed from making undesirable vibration. If desired, the resiliently deformable member 56 may be arranged on the mutually facing surfaces of the first and second walls 59 and 60 of the second sliding shoe 49. In this case, the lift arm 47 is formed with a projection which is resiliently engageable with the member 56.

Figure 11:
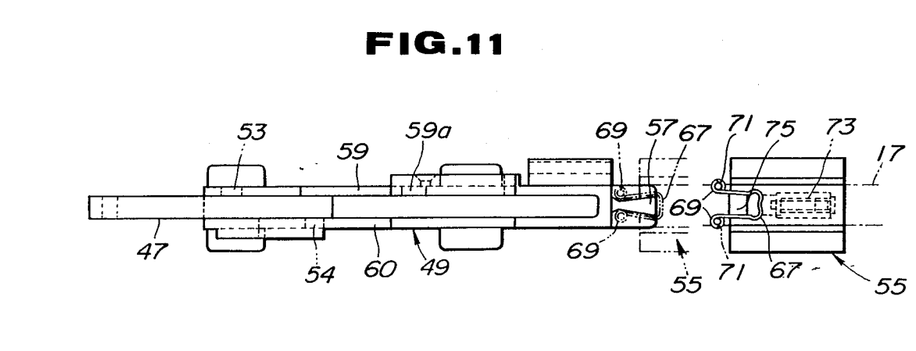
FIG. 11 is a plan view of the second sliding shoe and a third sliding shoe.

As is best seen from FIG. 11, the third sliding shoe 55 is located behind the second sliding shoe 49 and axially slidably engaged with the channel structure 15 of the guide rail 17. As is seen from FIG. 4A, the third sliding shoe 55 holds through a bracket 63 a left end of a laterally extending rain water drain gutter 65.

Referring back to FIG. 11, the third sliding shoe 55 is equipped at its front end with a clip 67 which has a generally Ω (omega)-shaped cross section. That is, the clip 67 is constructed of a resilient metal plate and comprises a base portion held by the shoe 55, and two outwardly biased arms each having a leading end 69 turned outwardly. The outwardly turned ends 69 of the arms are slidably engaged with the opposed edges of the channel of the guide rail 17. The opposed edges of the channel are formed at a given position with respective stopper recesses 71 into which the outwardly turned ends 69 of the arms fall when the third sliding shoe 55 comes to a given stopped position. A strut member 75 is put between the arms of the clip 67. The strut member 75 has a normally bent extension led into the body of the third sliding shoe 55. The inward end of the extension is incorporated with a biasing spring 73, so that the strut member 75 is biased forward, that is, toward a position wherein the strut member 75 is placed near the turned leading ends of the arms. Thus, under this condition, the arms are prevented from flexing toward each other. That is, even when, with the turned ends of the arms kept engaged with the stopper recesses 71, an external force is applied to the clip 67, the latter is prevented from disengagement from the stopper recesses 71. It is to be noted that when, with the strut member 75 being retracted, the clip 67 assumes a position other than the stopped position, the clip 67 is shaped to coincide with the dove-tail shaped engaging portion 57 of the second sliding shoe 49. Thus, it will be appreciated that when, with the third sliding shoe 55 assuming its stopped position with the clip 67 engaged with the stopper recesses 71, the second sliding shoe 49 moves rearward and comes to a position where the dove-tail engaging portion 57 of the second sliding shoe 49 is thrust between the arms of the clip 67 and pushes the strut member 75 rearward, the strut member 75 is retracted into the body of the third sliding shoe 55 against the force of the spring 73. Under this condition, the two arms of the clip 67 are permitted to flex toward each other cancelling the latched engagement between clip 47 and the stopper recesses 71. Thus, thereafter, pushing of the second sliding shoe 49 rearward permits a sliding of the third sliding shoe 55 in the same direction. Once the above-mentioned latched engagement is cancelled, the dove-tail shaped engaging portion 57 of the second sliding shoe 49 is tightly held by the clip 67 of the third sliding shoe 55, in a manner as is shown by phantom lines in FIG. 11.

As is seen from FIG. 4A, the mounting bracket 13 is provided at its rear end with an L-shaped stopper member 79 which comprises a major part and a normally bent lower end 81. As is seen from FIG. 10, the stopper member 79 is incorporated with a longitudinally extending smaller channel structure possessed by the guide rail 17. That is, this smaller channel structure comprises upper and lower flanges 83 and 84 which extend in parallel along the length of the guide rail 17. The upper flange 83 is formed at a given portion with a cut 83a through which the lower end 81 of the stopper member 79 passes when the lid 9 is tilted down. Usually, the lower end 81 of the stopper member 79 is slidably engaged with the channel of the smaller channel structure (83 +84) to suppress a vertical movement or play of the rear end of the lid 9.

Figure 10:
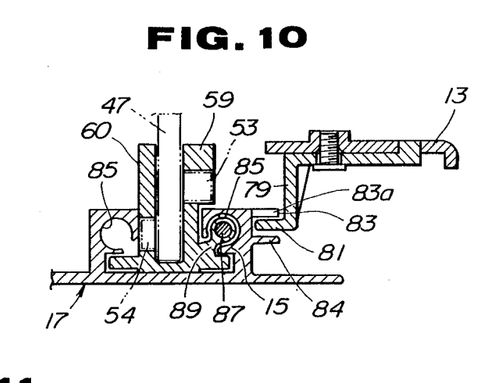
FIG. 10 is an enlarged sectional view taken along the line X—X of FIG. 6A.

As is seen from FIG. 10, the channel structure 15 of the guide rail 17 is formed at opposed side walls with respective cable guide grooves 85 each extending along the length of the guide rail 17. A geared cable 87 is slidably received in the inside groove 85. The geared cable 87 is meshed with a drive pinion of a reversable electric motor (not shown) which is mounted on the ceiling of a passenger room at the front of the sun roof opening 7. It is to be noted that a free end portion (not shown) of the geared cable 87 which is drawn from the drive pinion is slidably led into the outside cable guide groove of the other guide rail (not shown) from the front open end of the same. The other geared cable (not shown) incorporated with the inward cable guide groove of the other guide rail (not shown) is also meshed with the drive pinion having its free end portion slidably led into the outside cable guide groove 85 of the illustrated guide rail 17 from the front open end of the same. Thus, when the electric motor is energized to run in one direction, the two geared cables 87 slide rearward (or forward) in the corresponding cable guide grooves 85 of the paired guide rails 17, when the electric motor is energized to run in the other direction, the geared cables 87 slide forward (or rearward).

As is seen from FIG. 10, the geared cable 87 is held by a holder 89 which is integral with the second sliding shoe 49, so that the axial movement of the geared cable 87 induces a sliding movement of the second sliding shoe 49 along the guide rail 17.

As has been mentioned previously, the other control unit which is arranged at a right side of the sun roof opening 7 is substantially the same as the above-mentioned left unit. It is thus to be noted that the lid 9 is supported at its front portion by the left and right first sliding shoes 19a and at its rear portion by the left and right second sliding shoes 49.

In the following, operation of the lid regulating device of the invention will be described with reference to FIGS. 4A to 6B which illustrate various conditions of the left unit of the lid regulating device.

For ease of understanding, the description will be commenced with respect to the fully closed condition of the lid 9, as shown in FIG. 5A, wherein the weather strip 11 of the lid 9 is in resilient contact with the bent edge 1a of the sun roof opening 7 to achieve a water-tight sealing therebetween.

Under this closed condition, the stopper pin 27 of the lock mechanism 23 is engaged with the stopper opening 39 of the first sliding shoe 19a, so that forward and reaward movement of the lid 9 is suppressed. As is best seen from FIG. 5B, in the second sliding shoe 49, the first and second pins 53 and 54 are placed at the second parts 51b and 52b of the first and second slots 51 and 52 respectively causing the lift arm 47 to assume its rest or neutral position. Furthermore, under this fully closed condition of the lid 9, the third sliding shoe 55 assumes the stopped position having the clip 67 engaged with the stopper recesses 71 of the guide rail 17. Because, in this condition, the stopper pin 27 and the operation lever 29 are fully concealed by the first sliding shoe 19a, they are protected from being handled accidentally. Furthermore, the intimate engagement between the wedge-shaped boss 35 of the first sliding shoe 19a and the wedge-shaped recess 33 of the holder 25 suppresses the undesired upward and downward play of the front portion of the lid 9. The suppression of the play of the lid 9 is much assured by the fact that the lift arm 47 of the lifting mechanism is stably held by the second sliding shoe 49 through the lift arm biasing means, viz., the resiliently deformable member 56. Thus, running of the motor vehicle is carried out without the undesired noisy vibration of the lid 9.

When, now, by energizing the electric motor, the geared cable 87 is slid forward (that is, leftward in FIG. 5A) by a given small distance, the first pin 53 is slid up to the third part 51c of the first guide slot 51 and at the same time the second pin 54 is slid to the third horizontal part 52c of the second guide slot 52, thereby causing the lift arm 47 to pivotally turn clockwisely to its uppermost position, as shown in FIG. 4B. It is to be noted that such clockwise movement of the lift arm 47 is caused by a fact that the forward movement of the lid 9 is suppressed by the lock mechanism 23. Thus, the lid 9 assumes the tilt-up position as shown in FIG. 4A. Under this condition, the first and second pins 53 and 54 are pressed against the terminal ends of the first and second guide slots 51 and 52, so that the lift arm 47 is prevented from making undesirable play.

Due to the inherency of the pivoting structure using the two pivot pins 53 and 54 in the above-mentioned manner, the lid lifting rate (viz., the rate of the vertically raising speed of the leading end of the lift arm 47 to the horizontally moving speed of the lower portion of the lift arm 47) is great as compared with the aforementioned conventional lifting mechanism of FIGS. 17 to 20. This means that the lid 9 can be supported by the lift arm 47 at a relatively rear portion of the lid 9 and, thus, the rigidity of the rear portion of the lid 9 is increased.

When, by energizing the electric motor to run in a reversed direction, the second sliding shoe 49 is slid rearward (that is, rightward in FIG. 4A) by a given small distance, the first and second pins 53 and 54 return to the second parts 51b and 52b of the first and second guide slots 51 and 52. Thus, the lift arm 47 returns to its rest position causing the lid 9 to assume the fully closed position as shown in FIG. 5A. Due to the provision of the rounded projection 52d in the zone of the second part 52b of the second guide slot 52, the lid 9 is forced to tilt down from a temporarily set fully closed position thereof before assuming the assured fully closed position. With this operation, the watertight sealing between the weather strip 11 and the bent edge 1a of the sun roof opening 7 is much assured.

When the second sliding shoe 49 is further slid rearward due to continuous operation of the electric motor, the first and second pins 53 and 54 of the lift arm 47 move to the first parts 51a and 52a of the first and second guide slots 51 and 52 causing the lift arm 47 to assume its lowermost position. Thus, the lid 9 assumes the tilt-down position as shown in FIG. 6A wherein the rear end of the lid 9 is placed below the outer panel 5. Under this condition, the operation lever 29 (more specifically, the upper projection 45 of the lever 29) of the first sliding shoe 19a is pressed downward by the lower surface 13a of the mounting bracket 13 cancelling the latched engagement of the first sliding shoe 19a to the guide rail 17. The rearward movement of the second sliding shoe 49 causes the dove-tail engaging portion 57 of the shoe 49 to collide against the strut member 75 of the third sliding shoe 55 thereby achieving a connection between the second and third sliding shoes 49 and 55.

When the second sliding shoe 49 is further slid rearward due to the continuous operation of the electric motor, the lid 9 is moved into a container space W defined below the outer panel 5 of the vehicle roof, together with the first, second and third sliding shoes 19a, 49 and 55. Thus, under this condition, the sun roof opening 7 is fully opened.

When, now, the electric motor is energized to run in the other direction, the second sliding shoe 49 is slid forward together with the lid 9. During this sliding movement, the third sliding shoe 55 comes to the given position where the clip 67 is engaged with the stopper recesses 71 of the guide rail 17. Thus, further forward movement of the lid 9 is carried out with the third sliding shoe 55 left at the given stopped position. That is, the first and second sliding shoes 19a and 49 come to the positions as shown in FIG. 6A and finally assume the positions as shown in FIG. 5A by carrying out operations which are reversed to those carried out during the movement of the lid 9 from the position FIG. 5A to the position of FIG. 6A. When the lid 9 assumes the fully closed position of FIG. 5A, the stopper pin 27 of the lock mechanism 23 is projected into the stopper opening 39 of the first sliding shoe 19a to achieve the latched engagement of the first sliding shoe 19a relative to the guide rail 17.

Referring to FIGS. 12 to 16, there is shown a modification of the lid lifting mechanism incorporated with the second sliding shoe 49.

Figures 12, 13, 14:
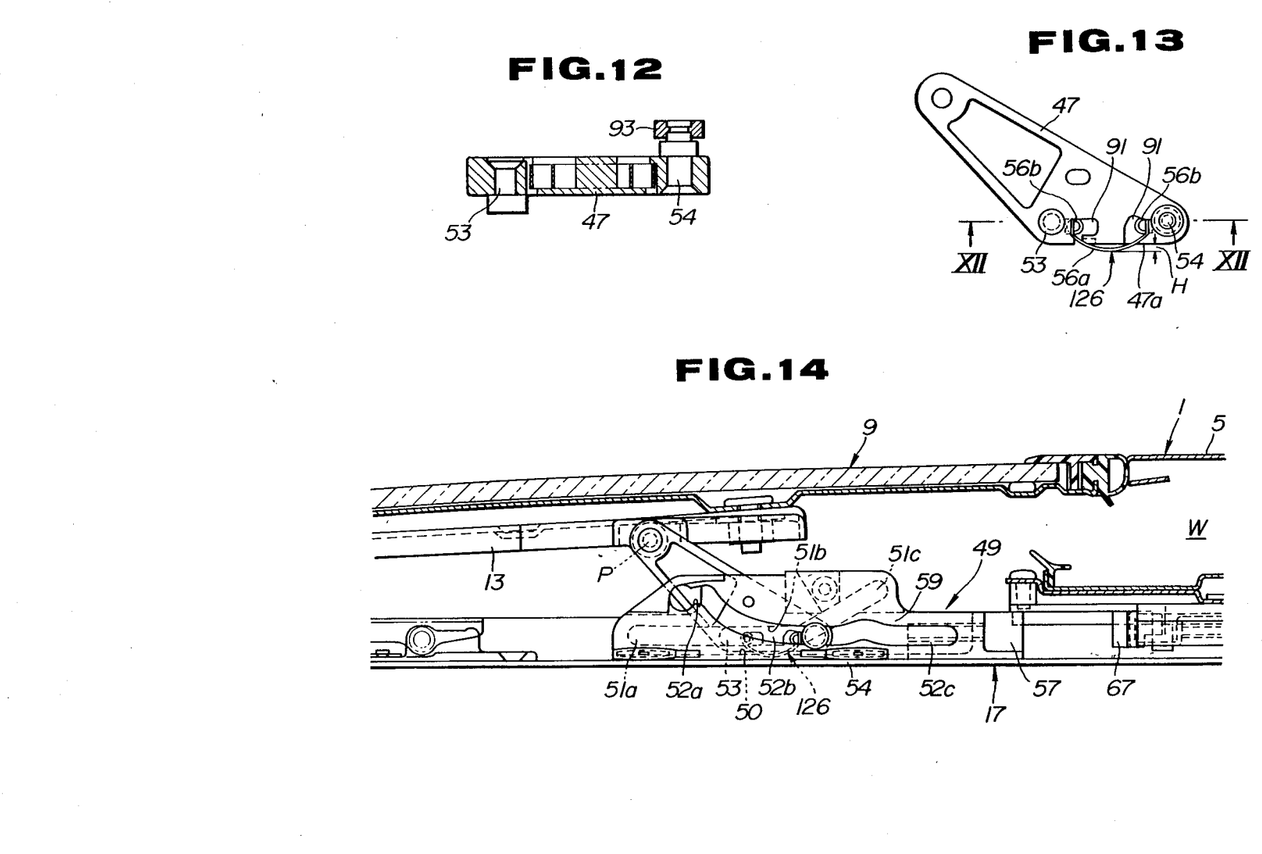
FIG. 12 is a sectional view of a lift arm of a modified lid lifting mechanism, which is taken along the line XII—XII of FIG. 13.
FIG. 13 is a side view of the lift arm of the modified lid lifting mechanism.
FIGS. 14, 15 and 16 are sectional views of the modified lid lifting mechanism, showing various conditions of the same respectively.

In this modification, a spring metal plate 126 is used as the lid arm biasing means. As is seen from FIG. 13, the spring plate 126 is connected to the lower side 47a of the lift arm 47 having both ends 56b latchingly held by spaced recesses 91 formed in the lift arm 47. A major portion 56a of the spring metal plate 126 is protruded outwardly from the lower side 47a, so that the portion 56a can be resiliently deformable. The protruded portion 56a is so sized and constructed that when the lift arm 47 is in the neutral position as shown in FIG. 14, the portion 56a is resiliently pressed against the bottom portion 50 of the second sliding shoe 49. Thus, the lift arm 47 under such condition is suppressed from making undesirable vibration.

Figure 15:
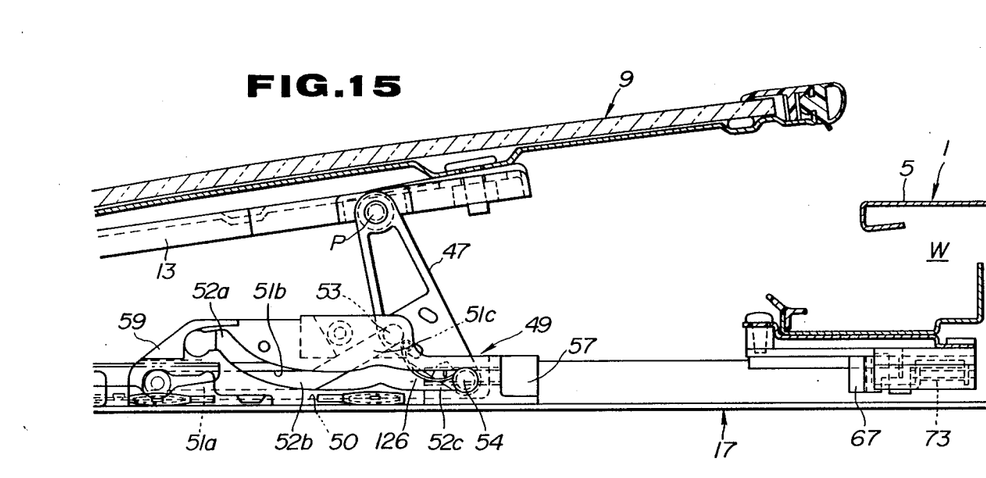
Figure 16:
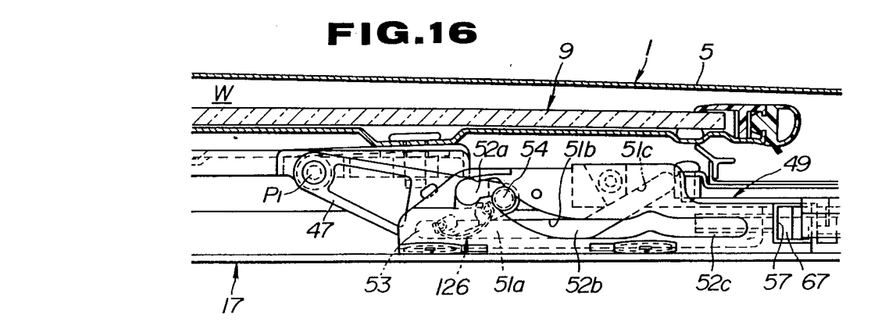

As is seen from FIG. 15 (which shows a tilt-up condition of the lid 9) and FIG. 16 (which shows a tilt-down condition of the lid 9), the spring metal plate 126 has no means or structure which interrupts or obstructs the pivotal movement of the lift arm 47 when the lid 9 is shifted to the tilt-up position or the tilt-down position. Thus, such shifting of the lid 9 is smoothly carried out.

Referring back to FIG. 12, a roller 93 is rotatably held by the second pin 54. The roller 93 has substantially the same function as the L-shaped stopper member 79 of the afore-mentioned lid regulating device of FIG. 10. That is, when the lid 9 is tilted down from the fully closed position, the roller 93 passes through the cut 83a and is brought into engagement with the channel of the smaller channel structure (83+84) for preparation of running along the channel toward the lid container space W. The sliding engagement between the roller 93 and the channel suppresses an undesired vertical play of the rear end portion of the lid 9 relative to the guide rail 17.

What is claimed is:

1. In a sun roof structure including a lid and a sun roof opening defined by a roof,
   a lid regulating device comprising:
   a guide rail extending along each side of said sun roof opening and secured to said roof;
   a first sliding shoe slidably engaged with said guide rail, said first sliding shoe having an extension which is pivotally connected to a front portion of said lid;
   a second sliding shoe slidably engaged with said guide rail and supporting a rear portion of said lid; and
   a lid lifting mechanism mounted on said second sliding shoe to tilt said lid upward and downward about said front portion of the lid, said lid lifting mechanism including
   mutually spaced first and second walls formed on said second sliding shoe, said first and second walls being respectively formed with first and second guide slots each extending along the corresponding wall, the shapes of said first and second guide slots being asymmetrical with respect to a longitudinal cross-sectional plane centrally extending between said first and second walls; and a lift arm having one end pivotally connected to a rear portion of said lid, said lift arm having at its opposed side surfaces asymmetrically positioned first and second pins which are respectively and slidably engaged with said first and second guide slots.

2. A lid device as claimed in claim 1, in which said asymmetric first and second guide slots and said asymmetric first and second pins are so constructed and arranged that when, with said lid assuming its fully closed position relative to said sun roof opening, said second sliding shoe is moved toward said first sliding shoe, said lift arm is gradually raised from a neutral position, and when, with said lid assuming the fully closed position, said second sliding shoe is moved away from said first sliding shoe, said lift arm is gradually lowered from said neutral position.

3. A lid regulating device as claimed in claim 2, in which each of said asymmetrical first and second guide slots comprises a substantially horizontal section and a substantially inclined section.

4. A lid regulating device as claimed in claim 3, wherein said horizontal section of said first guide slot is positioned, about said centrally extending cross-sectional plane, opposite said inclined section of said second guide slot, and said inclined section of said first guide slot is positioned opposite said horizontal section of said second guide slot.

5. A lid regulating device as claimed in claim 4, in which said first wall is formed with a guide groove which extends from an upper terminal end of said first wall to said first guide slot.

6. A lid regulating device as claimed in claim 5, in which said guide groove has a stopper bolt fixed thereto.

7. A lid regulating device as claimed in claim 4, in which said second guide slot is formed at a terminal end of said inclined section thereof with an enlarged portion.

8. A lid regulating device as claimed in claim 4, in which said second guide slot has a rounded projection positioned between a terminal end of said horizontal section and another horizontal section.

9. A lid regulating device as claimed in claim 4, in which said lid lifting mechanism further comprises a biasing means for biasing said lift arm in one direction when said lift arm assumes a position having said asymmetric first and second pins placed at said horizontal sections of said asymmetrical first and second guide slots respectively.

10. A lid regulating device as claimed in claim 9, in which said biasing means comprises a resiliently deformable member held by said second sliding shoe, said resiliently deformable member being so arranged and constructed that when said lift arm assumes said position, a portion of said lift arm is pressed against said resiliently deformable member.

11. A lid regulating device as claimed in claim 10, in which said resiliently deformable member is constructed of a plastic.

12. A lid regulating device as claimed in claim 9, in which said biasing means comprises a spring metal plate which is connected to said lift arm having a major portion thereof protruded outward from said lift arm, said spring metal plate being so arranged and constructed that when said lift arm assumes said position, the outwardly protruded major portion of said spring metal plate is resiliently pressed against a part of said second sliding shoe.

13. A lid regulating device as claimed in claim 4, further comprising:
means defining in said extension of said first sliding shoe a stopper opening; and
a stopper structure including a holder securedly mounted on said guide rail, a stopper pin axially movably held by said holder and biasing means for biasing said stopper pin outwardly, said stopper pin being projected into said stopper opening when said lid is brought into its fully closed position.

14. A lid regulating device as claimed in claim 13, in which in which said first sliding shoe has an operation lever pivotally connected thereto, said operation lever having a projection which, when the lid assuming the fully closed position is tilted downward, pushes said stopper pin against the force of said biasing means thereby to disengage said stopper pin from said stopper opening.

15. A lid regulating device as claimed in claim 14, in which said operation lever is formed with another projection which contacts a lower surface of a mounting bracket when said lid is tilted downward from the fully closed position, said mounting bracket being secured to a lower surface of said lid.

16. A lid regulating device as claimed in claim 15, in which said holder of said stopper structure is formed with a bore in which said stopper pin is slidably received, and in which said biasing means is a coil spring disposed in a bottom of said bore to bias said stopper pin to project outwardly.

17. A lid regulating device as claimed in claim 16, in which said another projection of said operation lever is positioned nearer to the pivotally connected portion of said operation lever than the projection which pushes said stopper pin.

18. A lid regulating device as claimed in claim 17, in which said holder is formed with a recess facing toward said second sliding shoe, and in which said first sliding shoe is formed with a boss, said boss intimately engaged with said recess when said lid comes to the fully closed position.

19. A lid regulating device as claimed in claim 18, in which said recess has a wedge-shaped bottom, and in which said boss has a wedge-shaped tip, so that upon fully closing of said lid, said boss and said recess are intimately engaged thereby suppressing an upward and downward play of the front portion of the lid relative to the roof.

20. A lid regulating device as claimed in claim 19, in which said operation lever partially occupies a recess formed in said extension of said first sliding shoe.

21. A lid regulating device as claimed in claim 4, in which said first wall is constructed shorter than said second wall in order to facilitate coupling of said lift arm and said asymmetrical first and second walls.

* * * * *